(12) United States Patent
Bouleau et al.

(10) Patent No.: US 6,375,102 B1
(45) Date of Patent: Apr. 23, 2002

(54) ELECTRICAL HOUSEHOLD APPLIANCE FOR PROCESSING FOOD COMPRISING A SAFETY DEVICE

(75) Inventors: Jean-Paul Bouleau, Champfleur; Joel Deschamps, Mayenne, both of (FR)

(73) Assignee: Moulinex S.A., Paris (FR)

( * ) Notice: Subject to any disclaimer, the term of this patent is extended or adjusted under 35 U.S.C. 154(b) by 0 days.

(21) Appl. No.: 09/462,208
(22) PCT Filed: Jun. 3, 1998
(86) PCT No.: PCT/FR98/01426
§ 371 Date: Mar. 21, 2000
§ 102(e) Date: Mar. 21, 2000
(87) PCT Pub. No.: WO99/01060
PCT Pub. Date: Jan. 14, 1999

(30) Foreign Application Priority Data

Jul. 4, 1997 (FR) ............................................. 97 08533

(51) Int. Cl.[7] ................................................ A47J 42/56
(52) U.S. Cl. ...................... 241/37.5; 241/36; 241/282.1; 241/28.2
(58) Field of Search ...................... 241/36, 37.5, 282.1, 241/282.2

(56) References Cited

U.S. PATENT DOCUMENTS

| | | | | |
|---|---|---|---|---|
| 3,892,365 A | * | 7/1975 | Verdum ........................ | 241/92 |
| 4,216,917 A | * | 8/1980 | Clare et al. ................. | 241/37.5 |
| 4,226,373 A | * | 10/1980 | Williams ..................... | 241/37.5 |
| 4,321,741 A | * | 3/1982 | Williams ..................... | 29/434 |
| 4,396,159 A | * | 8/1983 | Podell ........................ | 241/37.5 |
| 5,037,033 A | * | 8/1991 | Stottmann et al. .......... | 241/37.5 |
| 5,454,299 A | * | 10/1995 | Gonneaud .................... | 99/492 |
| 5,486,665 A | * | 1/1996 | Le Rouzi ..................... | 200/302.2 |

FOREIGN PATENT DOCUMENTS

FR 2147361 * 2/1973

* cited by examiner

Primary Examiner—Allen Ostrager
Assistant Examiner—William Hong
(74) Attorney, Agent, or Firm—Young & Thompson

(57) ABSTRACT

An appliance includes a housing (1) containing a motor (2) whose output shaft (8) passes through the housing base (4) and drives in rotation a tool (16) housed in a bowl (9) locked on the housing and closed by a lid (12); and a safety device (25) having a vertical thruster (27) mounted sliding in the bowl (9) peripheral wall (30) and actuated by a cam (43) borne by the lid (12) so as to penetrate in an opening (39) provided in the base to be urged to actuate a switch controlling the motor. A rigid cover (49) is mounted on the base movable between an inoperative position wherein it conceals the base opening (39), when the bowl is not on the base (4), and an operative position wherein it clears the opening (39) by the action of an actuating member (51) borne by the bowl (9) when the latter is locked on the base (4).

10 Claims, 4 Drawing Sheets

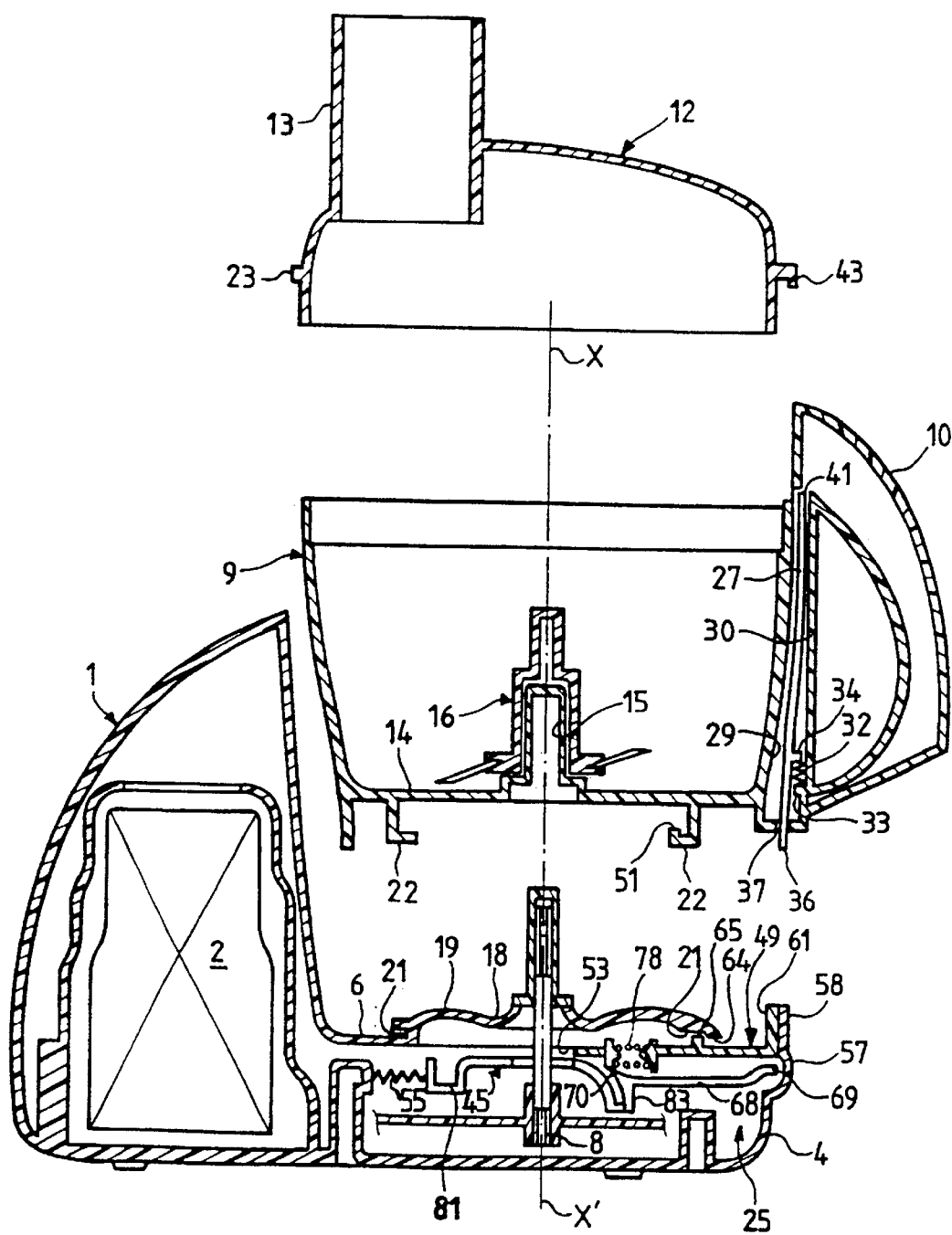
FIG_1

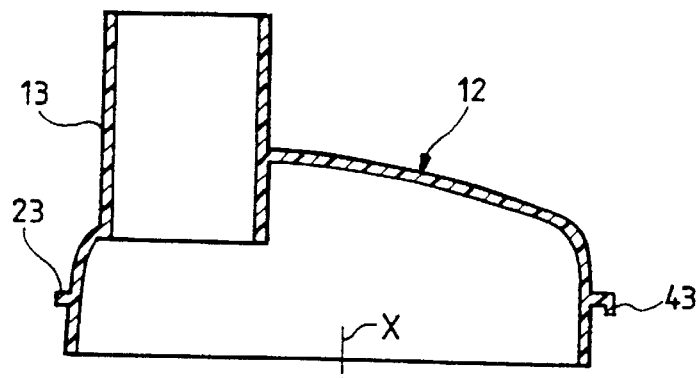
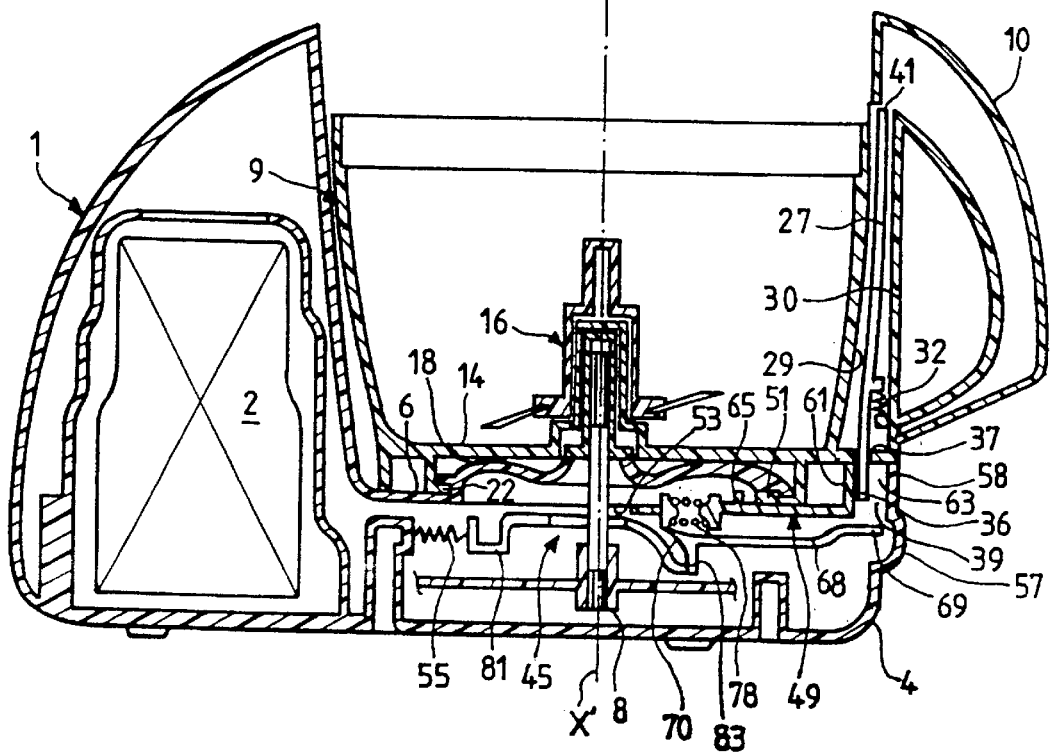
FIG_2

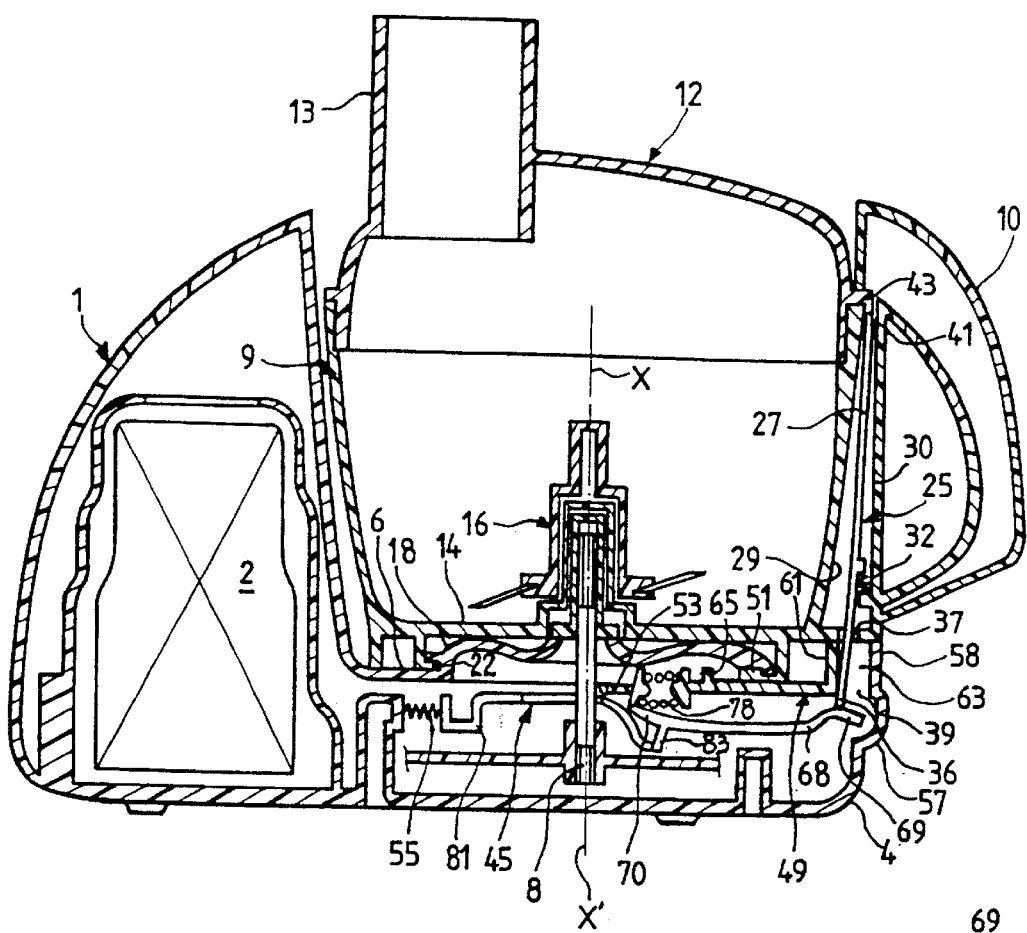
FIG_3
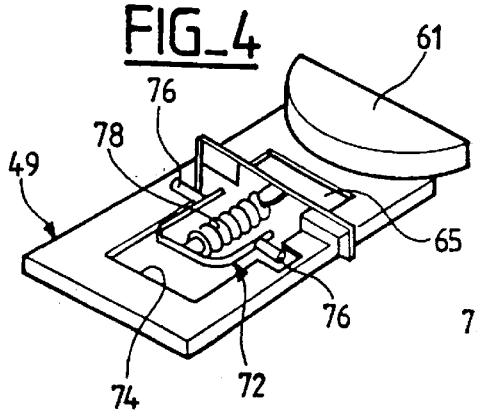
FIG_4
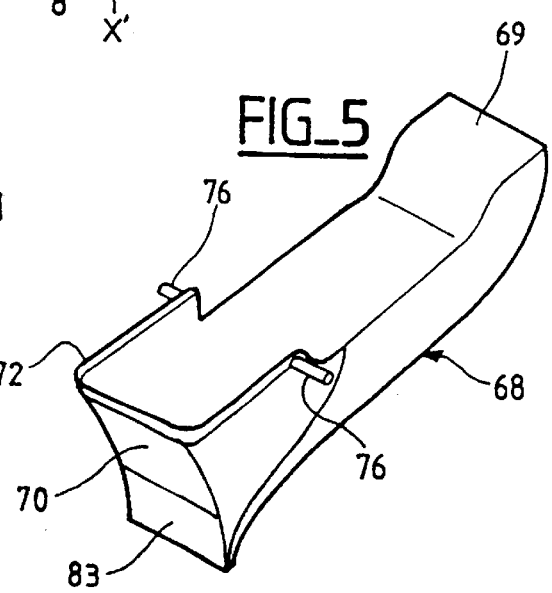
FIG_5

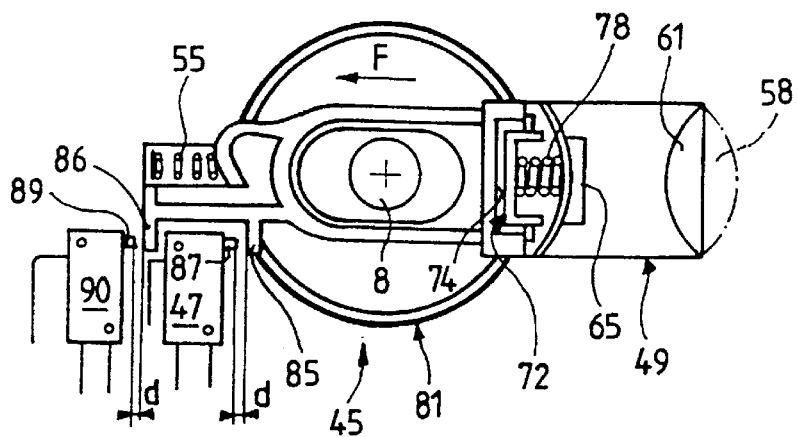
FIG_6
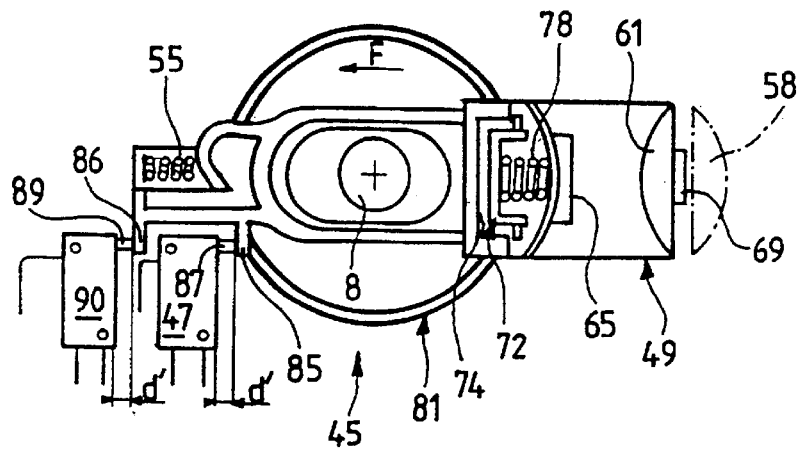
FIG_7
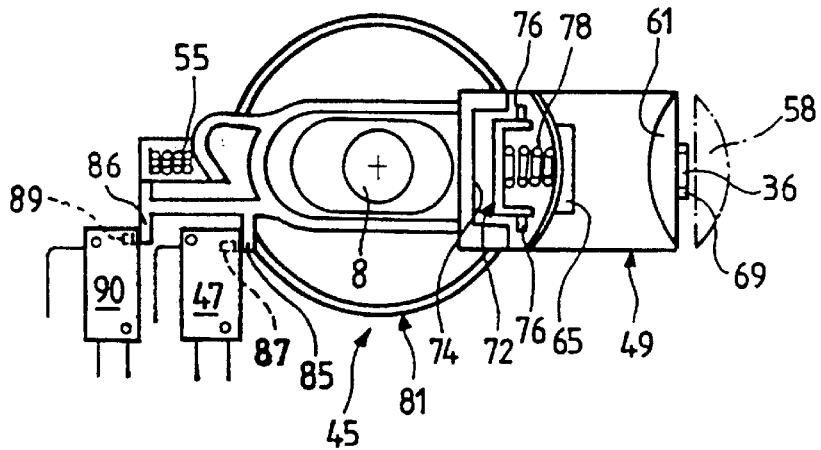
FIG_8

ELECTRICAL HOUSEHOLD APPLIANCE FOR PROCESSING FOOD COMPRISING A SAFETY DEVICE

CROSS REFERENCE TO RELATED APPLICATION

This is the 35 USC 371 national stage of International Application PCT/FR98/01426 filed on Jul. 3, 1998, which designated the United States of America.

FIELD OF THE INVENTION

The present invention relates to an electric household appliance for the processing of foods, of the type particularly, but not exclusively, of the food processor type, which comprises a housing enclosing an electric motor group and having a region forming a base whose upper surface is traversed by the output shaft of the motor group, and a bowl removably locked on the base of the housing, closed to lock with a removable cover, and receiving a working tool adapted to be driven in rotation by the motor shaft.

It relates more particularly to an apparatus of this type which moreover comprises a safety device comprising a switch arranged in the supply circuit of the motor, a pusher mounted vertically slidably in a recess provided over all the height of the peripheral wall of the bowl, whose lower end is disposed in alignment with an opening provided in the periphery of the base of the housing, when the bowl is locked on the base, and whose upper end is adapted to be actuated by a cam carried by the cover, when this latter is locked on the bowl in place, such that the pusher is lowered into the opening in the base, as well as a control mechanism disposed in the housing, actuated by the pusher when it is pushed down into said opening, and controlling the opening of the switch to permit controlling the closure of the switch to permit supply of the motor.

BACKGROUND OF THE INVENTION

It is known that in such apparatus, it is important to avoid any contact of the hand with the rotating working tool, constituted generally by a slicing tool considered dangerous, so as to prevent accidents and, to this end, the safety device of the above type with which the apparatus is provided is adapted to permit the operation of the motor only when the bowl is locked on the base of the housing, and when this bowl is itself locked by the cover.

In an electrical household appliance provided with a known safety device of this type, as described in FR-A-2 472 925, the opening of the base adapted to the passage of the pusher opens outwardly when the bowl is not in place on the base, and is closed in its lower portion by a flexible deformable membrane which is maintained by a lip formed on the internal surface of the base, such that during locking of the cover on the bowl once in place on the base, the cam carried by the cover actuates the pusher which is then pushed down into the opening of the base, which pusher stretches the membrane and acts on the control mechanism of the switch to cause closing of the electrical supply circuit of the motor. However, this flexible membrane itself constitutes a costly member, difficult to emplace, adapted to come off, and subject to deterioration with time, even to be torn by the repeated stretching under the action of the pusher, thus rendering the apparatus unusable. Moreover, the opening of the base being outward, and hence visible, when the bowl is not in place, the latter tends to attract the attention, in particular of a child, and thus lead to accidental starting of the motor by stretching of the membrane with any object introduced into this opening. Moreover, this opening in the base forms a food trap which is therefore apt to frustrate the control of the switch, and which is difficult to clean.

SUMMARY OF THE INVENTION

The invention particularly has for its object to overcome these drawbacks and to provide an electrical household appliance, of the type described above, in which the safety device operates perfectly and with high reliability.

According to the invention, the safety device comprises moreover a rigid piece forming a cover which is movably mounted on the upper surface of the base of the housing between a rest position to which it is automatically brought when the bowl is not in place on the base and in which it masks the opening of the base, and an active position in which it is moved under the action of an actuating member carried by the bowl upon locking the latter on the base and in which it uncovers the opening of the base so as to permit passage of the pusher.

Thus, this rigid cover constitutes thereafter a truly robust mechanical piece, and hence is reliable, simpler, lost costly, easy to make and perfectly adapted to mass production. Moreover, the opening in the base being masked automatically by the cover in the rest position, when the bowl is not in place, this cover constitutes itself a member adapted to dissuade any child from having access to the control mechanism of the switch, and hence accidentally to start the motor, which especially increases the safety of the device. This increase in safety is the more justified as the movement of the cover permits uncovering the opening of the base which is itself subjected to the locking of the bowl on the base.

According to a preferred embodiment, the cover is horizontally slidably mounted, in a direction transverse to the vertical axis of the motor shaft, in a recess which is provided in the upper surface of the base extending to the peripheral edge of said base, and into which opens the opening of the base, said cover being slidably mounted the action of a return spring which tends to return it to the rest position.

BRIEF DESCRIPTION OF THE DRAWINGS

The characteristics and advantages of the invention will become more apparent from the description which follows, by way of non-limiting example, with reference to the accompanying drawings, in which:

FIG. 1 is a schematic exploded view in vertical cross-section of a housing, of a bowl and of a cover of an electrical household appliance according to the invention;

FIG. 2 is a view similar to FIG. 1, after locking the bowl on the housing;

FIG. 3 is a view similar to FIG. 2, after locking the cover on the bowl;

FIG. 4 is a schematic perspective view, on an enlarged scale, of a cover on which is pivotally mounted a swinging lever;

FIG. 5 is a schematic perspective view, on a larger scale, of this swinging lever; and FIGS. 6, 7 and 8 are schematic plan views of a sliding control member for two switches, associated with the cover of FIG. 4, and adapted to occupy three positions corresponding respectively to a rest position (FIG. 6) in which the bow is not locked on the base (FIG. 1), an intermediate position (FIG. 7) in which the bowl is locked on the housing (FIG. 2), and a closure position (FIG. 8) in which the cover is locked on the bowl in place (FIG. 3).

DETAILED DESCRIPTION OF THE INVENTION

The electric household appliance for food processing, shown in FIGS. 1 to 3, is a food processor comprising a housing or a base 1 having a general L shape which encloses an electric motor group 2 and which has a region forming a base 4, for example of circular shape, whose upper surface 6 is traversed by the vertical output shaft 8, along an axis XX', of the motor group. On this base 4 is adapted to be mounted removably a working bowl or receptacle 9 made of transparent plastic material and provided with a handle 10. The bowl 9 is adapted to be closed by the removable cover 12 provided with a hopper or feed tube 13 into which are introduced the foodstuffs to be prepared.

The bowl 9 has a bottom wall 14 surmounted by a chimney 15 (FIG. 1) in which the output shaft 8 of the motor group 2 is engaged, and houses a rotating working tool 16, such as a knife, which is fitted on the chimney 15 and which is coupled in rotation with the output shaft 8 of the motor group 2.

The bowl 9 is locked on the base 4 by means of a bayonet securement system and, to this end, the upper surface 6 of the base 4 has a projecting disk 18 whose upper surface 19 is provided laterally, regularly about its periphery, with a plurality of notches 21, better seen in FIG. 1, in which are inserted, upon rotation of the bowl 9, lugs 22, better seen in FIG. 1, carried by the external surface of the bottom wall 14 of the bowl 9.

The cover 12 is locked on the bowl 9 by means of a securement system of the bayonet type, of which one of the elements is designated 23 in FIGS. 1 and 2.

The food processor, FIGS. 1 to 3, moreover comprises a safety device, designated by the overall reference numeral 25 in FIGS. 1 and 3, comprising a pusher 27 mounted vertically slidably in a recess 29 provided over all the height of the peripheral wall 30 of the bowl 9 located facing the handle 10 of the bowl. The pusher 27 is slidably mounted against the force of a return spring 32 interposed between the horizontal bearing surface 33 formed in the peripheral wall 30 of the bowl and a small horizontal wing 34 formed at right angles on the pusher 27, in the lower part of this latter, see FIG. 1.

This pusher 27 has a lower end 36 which projects slightly through an opening 37 provided in the bottom of the peripheral wall 30 of the bowl 9, as shown in FIG. 1, and which is disposed in line with an opening 39 (FIGS. 2 and 3) provided in the periphery of the base 4, when the bowl 9 is locked to the base 4 as shown in FIG. 2.

The pusher 27 also has an upper end 41 which is actuated by a cam 43 carried by the cover 12, when this latter is locked on the bowl 9 in place as shown in FIG. 3, such that the pusher 27 is received within the opening 39 of the base against its return spring 32, see FIG. 3.

The safety device 25, FIG. 3, also comprises a control mechanism 45, which will be described in detail later, disposed in the housing 1, actuated by the pusher 27 when it is received in the opening 39 (see FIG. 3) and controlling the closing of a first switch, designated 47 in FIGS. 6 to 8, arranged in the supply circuit of the motor group.

According to the invention, this safety device moreover comprises a rigid member forming a cover 49 which is movably mounted on the upper surface 6 of the base 4 between a rest position (FIG. 1) to which it is automatically brought when the bowl 9 is not in place on the base 4 and in which it masks the opening 39 in the base, and an active position (FIG. 2) to which it is moved under the action of an actuating member 51 carried by the bowl 9 during locking of this latter on the base 4 and in which it uncovers the opening 39 in the base so as to permit the passage of the pusher 27.

According to a preferred embodiment of the invention, shown in FIGS. 1 to 3, the cover 49 is in the general shape of a rectangular plate which is slidably horizontally mounted, in a direction orthogonal to the vertical axis XX' of the output shaft 8 of the motor group 2, in a recess 53 which is provided in the upper surface 6 of the base 4 extending to the peripheral edge of this base, and into which opens the opening 39 in the base. This cover 49 is slidably mounted against the action of a return spring 55 connected to the control mechanism 45 and adapted to return it to the rest position (FIG. 1).

In this embodiment, the base 4 has at its periphery, on the same side as the cover 49, an integral vertically projecting bulge 57 having an upper portion forming a wing 58, for example of substantially semicircular shape as shown in broken lines on FIGS. 6 to 8, which raises it to a certain height relative to the upper surface 6 of the base 4. In this embodiment, the cover 49 comprises itself, at its front end located at the periphery of the base 4, a vertical wing 61, of a shape identical to that of the wing 58, in this instance of substantially semicircular shape but inverted relative to the shape of the wing 58 as is seen in FIGS. 4 and 6 through 8, which raises it to the same height as this wing 58 relative to the upper surface 6 of the base 4. Thus, when the cover 49 is in the rest position (FIG. 1), the two wings 58 and 61 are laterally secured to each other by their flat surface, thereby providing a seal for the housing 1; when the cover 49 slidably occupies, after a short movement, of the order of 3 millimeters, its active position (FIG. 2), the wing 61 of the cover 49 is then separated from the wing 58 of the bulge 57 so as to form between them a space 63 opening into the recess 53 of the cover and constituting itself the passage opening for the pusher 27.

As shown in FIG. 1, one of the notches 21 of the disk 18 extends to the level of the cover 49 and has an opening 64 through the disk, whilst the member 51, adapted to actuate the cover 49 upon rocking of the bowl 9 on the base 4, is in the form of a ramp provided on one of the lugs 22 of the bowl which is associated with this notch 21. The cover 49 carries a transverse rib 65 which is positioned in the opening 64 of this notch 21 in a manner subjacent to the upper surface of the disk 18, when the bowl 9 is not in place on the base 4, see FIG. 1. During locking by rotation of the bowl 9 on the base 4, the ramp 51 of the lug 22 of the bowl acts on the rib 65 of the cover 49 thereby to effect sliding of the cover 49 toward the center of the base 4, whose wing 61 separates from the wing 58 of the bulge 57 to form the opening 63 for passage of the pusher 27, as shown in FIG. 2.

Preferably, the cover 49 as well as its wing 61 and its rib 65 are molded of a single piece of rigid plastic material, as for example polypropylene.

It will here be noted that, when the bowl 9 is not in place on the base 4 (FIG. 1), the passage opening for the pusher 27 is closed by contact of the two wings 58 and 61, and the rib 65 of the cover is hidden below one of the lugs 21 of the disk 18, such that the cover 49 effectively prevents any child from manipulating this cover to make it slide in a way that could accidentally start the motor, thereby increasing the safety of the apparatus.

The control mechanism 45, FIGS. 1 to 3, comprises a swinging lever 68 extending below the cover 49, of which one end 69 is located adjacent the peripheral edge of the base 4 and is adapted to be actuated by the pusher 27 when the latter enters the opening 63 (FIG. 3), and whose other end 70 is shaped as a small lever 72, better seen in FIG. 5, which is articulatedly mounted on the upper surface of the cover 49, as seen in FIG. 4, through a recess 74 provided in the cover, by means of two pivots 76 constituting the swinging axis of the lever 68. This small lever 72 is urged by an energy storage compression spring 78 which, before swinging of the lever 68, extends in a plane parallel to the latter passing through the return spring 55 of the cover 49, as shown in FIG. 1.

This control mechanism 45 moreover comprises a control member 81, better seen in FIGS. 6 to 8, which is traversed by the output shaft 8 of the motor group, and which is horizontally slidably mounted in the housing 1, in the same direction as the cover 49. This control member 81 is associated with a vertical tongue 83 carried by the lever 68, below the small lever 72, and is urged by the return spring 55.

As seen in FIGS. 6 to 8, the control member 81 has at its rear portion two horizontal fingers 85 and 86, parallel to each other and extending perpendicularly to the direction of sliding of the control member 81, as indicated by the arrow F in FIGS. 6 and 7. The finger 85 is adapted to coact with pushbutton 87 for the switch 47 for controlling the closing of the supply circuit of the motor group, whilst the finger 86 is adapted to coact simultaneously to the finger 85 with a pushbutton 89 of a second switch 90, mounted reversely, and connected electrically to a device (not shown) but known per se, to control the braking of the electric motor.

By way of example, this braking device can be designed to cause to flow in the electric motor, if the latter is of the universal type, a countercurrent which creates a magnetic field tending to cause the motor to rotate reversely.

Preferably, the control member 81 and the two actuating fingers 85 and 86 are molded of a single piece of plastic material.

When the bowl 9 is not in place on the base 4, as shown in FIG. 1, the cover 49 is in rest position in which the passage opening for the pusher 27 is completely closed by the lateral contact of the two wings 56 and 61, and the control member 81 also occupies a rest position, shown in FIG. 6, in which the two fingers 85 and 86 do not actuate the two switches 47 and 90, respectively.

During locking by rotation of the bowl 9 on the base 4, FIG. 2, the cover 49 slides to expose the opening 63 into which penetrates the lower end 36 of the pusher 27; in the course of this sliding of the cover 49, the tongue 83 of the lever 68 articulatedly mounted on the cover 49 causes the sliding of the control member 81 against the return spring 55, in a first portion of the path of said approach, designated d in FIG. 6, at the end of which the two fingers 85 and 86 come into contact with the respective pushbuttons 87 and 89 of the two switches 47 and 90, as shown in FIG. 7.

Then, in the course of locking by rotation the cover 12 on the bowl 9, as shown in FIG. 3, the pusher 27 enters the opening 63 under the action of the cam 43 carried by the cover 12 and acts by its lower end 36 on the end 69 of the lever 68 which thus swings in a clockwise direction about the pivots 76 of the small lever 72. During swinging of the lever 68, the tongue 83 which carries this latter causes a new sliding of the control member 81, again against the return spring 55, on a second portion of the path, designated d' in FIG. 7, at the end of which the two fingers 85 and 86 depress the respective pushbuttons 87 and 89 of the two switches 47 and 90, as shown in FIG. 8. The switch 47 is then closed so as to permit a supply of the motor group 2, whilst the switch 90 remains in an open position.

It should be emphasized here that the energy storage compression spring 78 has a compressive force which is substantially greater than that of the return spring 55, so as to maintain pushed in the two respective pushbuttons 87 and 89 of the two switches 47 and 90 at the end of the path (d+d') of said control member 81.

After processing the food, the user unlocks the cover 12 in the course of which the cam 43 which it carries frees the pusher 27, which then rises under the action of its return spring 32 and which gives rise to a swinging in the counterclockwise direction of the lever 68; the assembly formed by the control member 81 and the cover 49 then slides in the reverse direction under the action of the return spring 55, along the portion of the path d' (FIG. 7) at the end of which the two fingers 85 and 86 free the respective pushbuttons 87 and 89 of the two switches 47 and 90, as shown in FIG. 7. The switch 47 opens, whilst the switch 90 passes from the closed condition in which it controls the braking device of the motor group 2, so as to stop very rapidly the rotation of the tool 16, and this even before the cover is completely withdrawn, thereby preventing any possibility of injury to the user.

The user then proceeds to unlock the bowl 9, then upon its withdrawal in the course of which the control member 81 and the cover 49 again slide in the reverse direction, along this time the portion of the path d (FIG. 6), to return to their rest position, as illustrated in FIGS. 1 and 6, in which the cover 49 closes the opening of the passage for the pusher 27.

It will be noted that the above description has been given with reference to a safety device for a food processor. Of course, this safety device is equally applicable to any other electrical household appliance for processing foods, such as in particular an electric chopper with a rotating knife, so designed that the housing enclosing the motor group will be arranged below the working bowl.

What is claimed is:

1. Electrical household appliance for processing food, comprising a housing (1) enclosing an electric motor group (2) and having a region forming a base (4) whose upper surface (6) is traversed by the output shaft (8) of the motor group (2); a bowl (9) removably locked on the base (4) of the housing, closed by locking a removable cover (12), and housing a working tool (16) adapted to be driven in rotation by the shaft (8) of the motor group; and a safety device (25) comprising a switch (47) arranged in the supply circuit of the motor, a pusher (27) vertically slidably mounted in a recess (29) provided over all the height of the peripheral wall (30) of the bowl (9), whose lower end (36) is disposed in line with an opening (39) provided in the peripheral of the base (4) of the housing, when the bowl (9) is locked on the base, and whose upper end (41) is adapted to be actuated by a cam (43) carried by the cover (12), when this latter is locked in place on the bowl, such that the pusher (27) enters the opening (39) of the base, as well as a control mechanism (45) disposed in the housing (1), actuated by the pusher (27) when it is in said opening (39), and controlling the closure of the switch (47) to permit supply of the motor, characterized in that the safety device (25) moreover comprises a rigid member forming a cover (49) which is movably mounted on the upper surface (6) of the base (4) of the housing between a rest position to which it is automatically brought when the bowl (9) is not in place on the base (4) and in which it covers the opening (39) in the base, and an active position in which it is displaced under the action of an actuating member (51) carried by the bowl (9) during locking of this latter onto the base (4) and in which it uncovers the opening (39) in the base so as to permit passage of the pusher (27).

2. Electrical household appliance according to claim 1, characterized in that the cover (49) is horizontally slidably mounted, in a direction transverse to the vertical axis (XX') of the shaft (8) of the motor group, in a recess (53) which is provided in the upper surface (6) of the base (4) extending to the peripheral edge of said base (4), and into which opens the opening (39) of the base, said cover (49) being slidably mounted against the action of a return spring (55) which tends to return it to a rest position.

3. Electrical household appliance according to claim 2, characterized in that the base (4) has at its periphery, facing the cover (49), an invertically projecting bulge (57) having an upper portion forming a wing (58) rising to a certain height above the upper surface (6) of the base (4), whilst the cover (49) comprises, at its so-called front end located at the periphery of the base (4), a vertical wing (61) which rises to the same height as the wing (58) of the bulge (57) and which is of the same size as this wing (58) of the bulge, said wing (61) of the cover (49) being in contact with the wing (58) of the bulge (57) when the cover (49) is in rest position and being separated from this wing (58) of the bulge when the cover (49) occupies by sliding its active position so as to form between them a space (63) opening into the recess (53) of the cover and constituting the opening (39) for passage of the pusher (27).

4. Electrical household appliance according to claim 2, in which the upper surface (6) of the base (4) of the housing has a projecting disk (18) whose upper surface (19) is provided laterally with notches (21) in which are inserted lugs (22) carried by the wall of the base (14) of the bowl (9) during locking of this latter on the base, thereby constituting a bayonet lock, characterized in that one (21) of the notches extends to the level of the cover (49) and the lug (22) with which it is associated has a ramp (51) constituting the actuating member and acting on a rib (65) which is formed on the cover (49) being positioned in said notch (21), subjacent to the upper surface (19) of the disc (18), so as to cause the cover (49) to slide toward its active position.

5. Electrical household appliance according to claim 3, characterized in that the cover (49), the wing (61) and the rib (65) are made of a single piece of rigid plastic material.

6. Electrical household appliance according to claim 2, characterized in that the cover (49) slides toward its active position along a short path, of the order of 3 millimeters.

7. Electrical household appliance according to claim 2, characterized in that the control mechanism (45) comprises a swinging lever (68) extending below the cover (49) and being articulated on this latter, of which one of the ends (69) is located adjacent the peripheral edge of the base (4) and is adapted to be actuated by the pusher (27) when the latter enters the opening (39) of the base, as well as a control member (81) horizontally slidably mounted in the base (4), in the same transverse direction as the cover, associated with a tongue (83) carried by the lever (68) and being urged by a return spring (55) constituting the return spring of the cover, and adapted to slide against the force of said return spring (55), during a first phase, along a first portion of a so-called approach path (d), under the action of the tongue (83) of the lever (68) when the cover (49) is displaced toward its active position upon locking of the bowl (9) on the base (4), the cover (12) not being locked on the bowl (9), then during a second phase, along a second portion (d') of its path, under the action also of the tongue (83) of the lever (68) during swinging of this latter as a result of the actuation of the end (69) of the lever by the pusher (27) during entry of this latter consecutive to the locking of the cover (12) on the bowl (9), said control member (81) having a first fingerprint (85) adapted to depress a pushbutton (87) of the switch (47) at the end of the path of this control member (81) so as to close the supply circuit of the motor.

8. Electrical household apparatus according to claim 7, characterized in that the other end (70) of the lever (68) is shaped as a small lever (72) pivotally mounted on the upper surface of the cover (49), through a recess (74) provided in the cover (49), by means of a pivot (76) constituting the swinging axis of the lever (68), and which is urged by an energy accumulator compression spring (78) extending in the plane parallel to that passing through the return spring (55) of the control member (81) and having a compressive force which is substantially greater than that of the return spring (55) of the control member so as to maintain the pushbutton (87) of the switch (47) depressed at the end of movement of the control member (81).

9. Electrical household appliance according to claim 7, characterized in that the control member (81) has a second finger (86) which coacts simultaneously with the first finger (85) with another switch (90) which can occupy either an open position at the end of the movement of the control member (81), or a closed condition to which it is brought by return of the control member (81) and in which it controls the braking means of the motor.

10. Electrical household apparatus according to claim 9, characterized in that the control member (81) and the first (85) and second (86) fingers are made of a single piece of plastic material.

* * * * *